US010021772B2

(12) United States Patent
Hung et al.

(10) Patent No.: US 10,021,772 B2
(45) Date of Patent: Jul. 10, 2018

(54) ELECTRO-STATIC DISCHARGE PROTECTION STRUCTURE AND ELECTRONIC DEVICE

(71) Applicant: Wistron Corporation, New Taipei (TW)

(72) Inventors: Wen-Shan Hung, New Taipei (TW); Wei-Cheng Lin, New Taipei (TW); Ping-Cheng Peng, New Taipei (TW); Hong-Kuei Lee, New Taipei (TW); Chi-Fang Weng, New Taipei (TW); Tzu-En Cheng, New Taipei (TW); Hui-Yu Li, New Taipei (TW)

(73) Assignee: Wistron Corporation, New Taipei (TW)

( * ) Notice: Subject to any disclaimer, the term of this patent is extended or adjusted under 35 U.S.C. 154(b) by 462 days.

(21) Appl. No.: 14/938,826

(22) Filed: Nov. 11, 2015

(65) Prior Publication Data
US 2017/0048954 A1    Feb. 16, 2017

(30) Foreign Application Priority Data
Aug. 10, 2015   (TW) .............................. 104125911 A (51) Int. Cl.
*H02H 7/24* (2006.01)
*H05F 3/04* (2006.01)
(Continued)

(52) U.S. Cl.
CPC ............. *H05F 3/04* (2013.01); *G06F 1/1656* (2013.01); *H01R 13/6485* (2013.01); *H01R 24/60* (2013.01)

(58) Field of Classification Search
USPC .................................................. 361/111–113
See application file for complete search history.

(56) References Cited

U.S. PATENT DOCUMENTS 5,163,850 A * 11/1992 Cronin .................... H01L 23/60
                                                                361/220
6,241,537 B1 * 6/2001 Tate .................... H01R 13/6485
                                                                361/799
(Continued)

FOREIGN PATENT DOCUMENTS

CN    201142795    10/2008
CN    204157158    2/2015
(Continued)

OTHER PUBLICATIONS

"Office Action of Taiwan Counterpart Application" with partial English translation, dated Aug. 31, 2016, p. 1-p. 14.
(Continued)

*Primary Examiner* — Ronald W Leja
(74) *Attorney, Agent, or Firm* — JCIPRNET (57) ABSTRACT

An electro-static discharge protection structure adapted to be utilized in an electronic device is provided. The electronic device includes a housing, a printed circuit board, and a connector. The electro-static discharge protection structure includes a first discharge circuit and a discharge device. The first discharge circuit is electrically connected to the housing. The discharge device is connected to the first discharge circuit. The discharge device includes a discharge plate which includes a plurality of charge entry points and a plurality of charge exit points. The connector is disposed between the discharge device and the printed circuit board. An electronic device including the electro-static discharge protection structure is also provided.

20 Claims, 6 Drawing Sheets

(51) Int. Cl.
   *G06F 1/16* (2006.01)
   *H01R 24/60* (2011.01)
   *H01R 13/648* (2006.01)

(56) References Cited

U.S. PATENT DOCUMENTS

| | | | | |
|---|---|---|---|---|
| 6,604,955 | B2* | 8/2003 | Dawson | H01R 13/6485 439/181 |
| 6,839,214 | B2* | 1/2005 | Berberich | H01R 13/6625 361/112 |
| 7,173,826 | B1* | 2/2007 | Chiou | H05K 5/0269 361/715 |
| 7,189,103 | B1* | 3/2007 | Brown | H01R 43/0263 439/493 |
| 7,433,203 | B1* | 10/2008 | Yi | H05K 1/0218 361/752 |
| 7,901,221 | B1* | 3/2011 | Li | H01R 13/6582 439/95 |
| 8,422,224 | B2* | 4/2013 | Tanaka | G06F 1/203 165/104.33 |
| 8,730,666 | B2* | 5/2014 | Tachikawa | G06F 1/1688 361/679.55 |
| 8,750,919 | B2* | 6/2014 | Hwang | H05K 1/0215 361/749 |
| 8,755,195 | B2* | 6/2014 | Savory | G06F 1/182 174/255 |
| 8,995,102 | B2* | 3/2015 | Lu | H02H 3/20 361/212 |
| 9,491,851 | B2* | 11/2016 | Lin | H05K 1/0259 |
| 2005/0122645 | A1* | 6/2005 | Ker | H05K 1/0259 361/56 |
| 2006/0279887 | A1* | 12/2006 | Lu | H04M 1/23 361/56 |
| 2009/0086448 | A1* | 4/2009 | Hiew | H05K 5/026 361/753 |
| 2011/0043954 | A1 | 2/2011 | Chuang et al. | |
| 2014/0376174 | A1* | 12/2014 | Dean | G06F 1/186 361/679.46 |
| 2017/0018816 | A1* | 1/2017 | Na | H01M 2/34 |
| 2017/0094791 | A1* | 3/2017 | Enriquez Shibayama | H05K 1/0296 |

FOREIGN PATENT DOCUMENTS

| | | |
|---|---|---|
| TW | 201108880 | 3/2011 |
| TW | 201419691 | 5/2014 |
| TW | 201419975 | 5/2014 |

OTHER PUBLICATIONS

"Office Action of China Counterpart Application," dated Sep. 19, 2017, p. 1-p. 7.

"Office Action of China Counterpart Application," dated Feb. 9, 2018, p. 1-p. 10.

* cited by examiner

ELECTRO-STATIC DISCHARGE PROTECTION STRUCTURE AND ELECTRONIC DEVICE

CROSS-REFERENCE TO RELATED APPLICATION

This application claims the priority benefit of Taiwan application serial no. 104125911, filed on Aug. 10, 2015. The entirety of the above-mentioned patent application is hereby incorporated by reference herein and made a part of this specification.

BACKGROUND OF THE INVENTION

Field of the Invention

The invention relates to an electro-static discharge protection technique and more particularly relates to an electro-static discharge protection structure and an electronic device having the electro-static discharge protection structure.

Description of Related Art

As the technology advances, electronic devices are developed to be thinner and lighter. Consequently, the circuit board that is hardly affected by electro-static interference may now be easily affected by electro-static interference due to improper design of the housing in the electronic device. For this reason, protection against static electricity becomes more and more important for electronic devices. After the electronic devices (such as laptop computers and tablet computers) are manufactured, they need to pass a strict electromagnetic compatibility (EMC) inspection to ensure the user's safety during use of the electronic devices.

When the user uses the electronic device, such as a laptop computer, the user may insert a corresponding transmission interface or a universal serial bus (USB) device while the laptop computer is running. If the USB device carries static electricity generated by the user and the user inserts the USB device into the USB connector of the laptop computer or directly touches the transmission interface of the electronic device and causes the static electricity in the user's hand to be transmitted to the circuit board, the static electricity may interfere with the chip set on the circuit board or even cause system failure or damage to the laptop computer. Thus, how to protect the electronic device such as the laptop computer from damage caused by external static electricity is an important issue that needs to be addressed.

SUMMARY OF THE INVENTION

The invention provides an electro-static discharge protection device for an electronic device. When a device carrying static electricity is inserted into the electronic device or when the user touches a transmission interface of the electronic device, the electro-static discharge protection device is capable of preventing the static electricity carried by the user from affecting or damaging a printed circuit board or the entire electronic device.

The invention provides an electronic device including an electro-static discharge protection structure for preventing the electronic device from being affected by static electricity when a device carrying the static electricity is inserted into the electronic device or when the user touches a transmission interface of the electronic device.

An electro-static discharge protection structure of the invention is adapted for an electronic device. The electronic device includes a housing, a printed circuit board, and a connector. The electro-static discharge protection structure includes a first discharge circuit and a discharge device. The first discharge circuit is electrically connected to the housing. The discharge device is connected to the first discharge circuit. The discharge device includes a discharge plate that includes a plurality of charge entry points and a plurality of charge exit points. The connector is disposed between the discharge device and the printed circuit board.

An electronic device of the invention includes a housing, a printed circuit board, an electro-static discharge protection structure, and a connector. The printed circuit board is disposed on the housing. The electro-static discharge protection structure includes a first discharge circuit and a discharge device. The first discharge circuit is electrically connected to the housing. The discharge device is connected to the first discharge circuit. The discharge device includes at least one discharge plate that includes a plurality of charge entry points and charge exit points. The connector is disposed between the discharge device and the printed circuit board.

In an embodiment of the invention, the at least one discharge plate further includes a first ground region and a second ground region. The charge exit points are disposed in the first ground region and the charge entry points are disposed in the second ground region.

In an embodiment of the invention, the at least one discharge plate further includes a plurality of discharge lines disposed between the charge entry points and the charge exit points.

In an embodiment of the invention, the second ground region is a hollow region disposed in the first ground region.

In an embodiment of the invention, the first ground region and the second ground region are presented in a zigzag pattern and a sharp point of the first ground region and a sharp point of the second ground region are arranged corresponding to each other with a gap therebetween, and static electricity is transmitted from the second ground region to the first ground region through the sharp points of the first and second ground regions by point discharge.

In an embodiment of the invention, the first ground region and the second ground region are arranged corresponding to each other in a staggered pattern. A gap between the first ground region and the second ground region is 1 cm or less.

In an embodiment of the invention, the electro-static discharge protection structure further includes a second discharge circuit connected to the discharge device. The connector is disposed between the second discharge circuit and the printed circuit board.

In an embodiment of the invention, the electro-static discharge protection structure further includes a first cover and a second cover. The first cover is connected between the first discharge circuit and the discharge device, and the second cover is connected between the second discharge circuit and the discharge device.

In an embodiment of the invention, the electro-static discharge protection structure further includes a first magnetic component and a second magnetic component that detachably fix the first discharge circuit and the second discharge circuit onto the housing and the connector respectively.

In an embodiment of the invention, the connector is a RS232 transmission interface port or a universal serial bus port.

Based on the above, the electronic device of the invention has the electro-static discharge protection device that prevents static electricity from directly transmitting to the printed circuit board of the electronic device and damaging the entire electronic device when a device carrying the static electricity is inserted into the connector or when the user directly touches the transmission interface of the electronic device.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
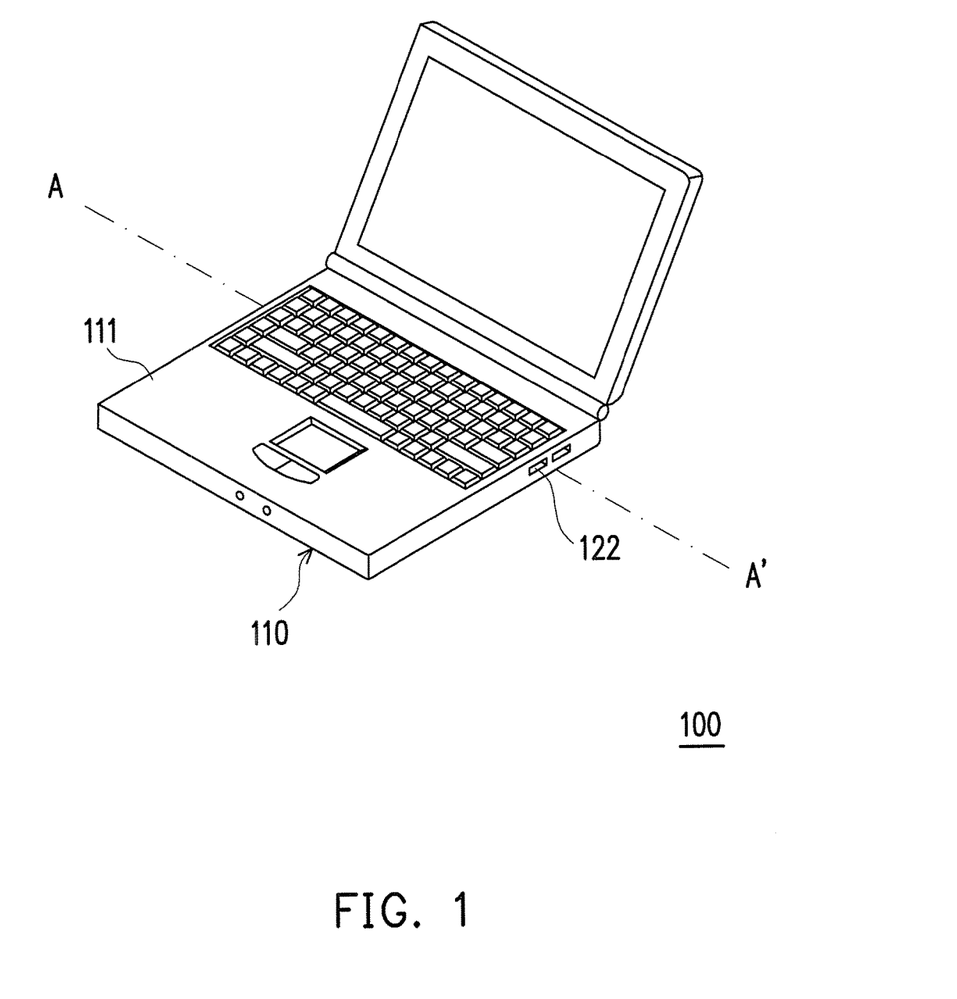
FIG. 1 is a schematic diagram of an electronic device according to an embodiment of the invention.
Figure 2:
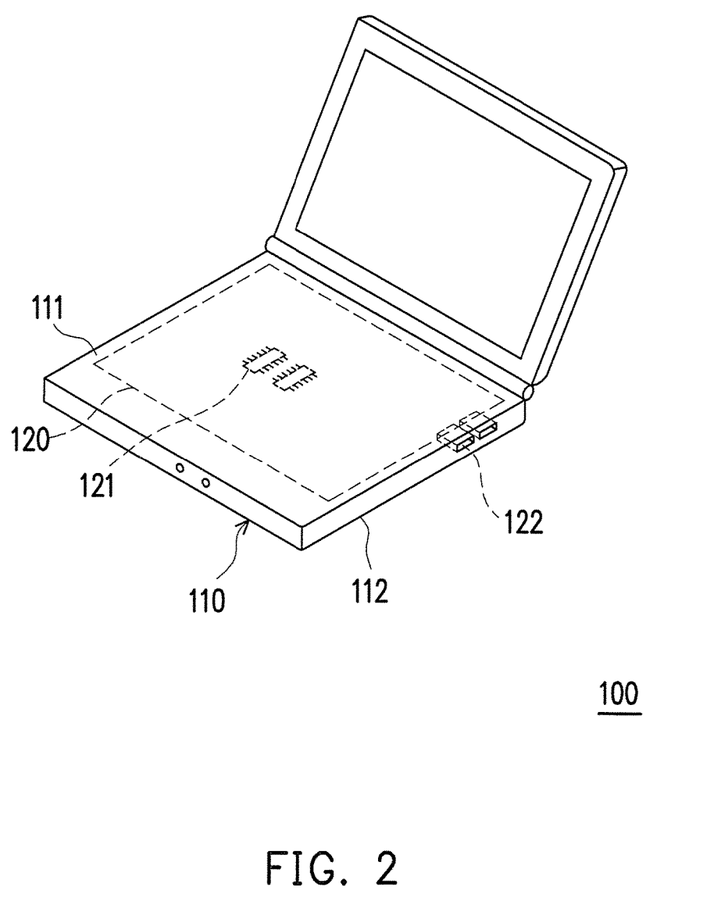
FIG. 2 is a perspective diagram of the electronic device of FIG. 1.

FIG. 1 is a schematic diagram of an electronic device according to an embodiment of the invention. FIG. 2 is a perspective diagram of the electronic device of FIG. 1. With reference to FIG. 1 and FIG. 2, in this embodiment, an electronic device 100 is a laptop computer, for example. The electronic device 100 includes a housing 110 and a printed circuit board 120. The housing 120 may be further divided into an upper housing 111 and a lower housing 112. As shown in FIG. 2, the printed circuit board 120 may be disposed on the lower housing 112. In this embodiment, the printed circuit board 120 has a plurality of chip sets 121 and a connector disposed thereon, and the connector is connected to each chip set 121. The connector is a signal transmission connector 122 in FIG. 1 and FIG. 2, for example. Moreover, in this embodiment, the signal transmission connector 122 may be a transmission interface port or a universal serial bus port. Further, the universal serial bus port may be a CRT connector, an HDMI connector, or a connector whose body or surface has a conductive material, such that the body and surface of the signal transmission connector 122 both have conductivity.

Figure 3:
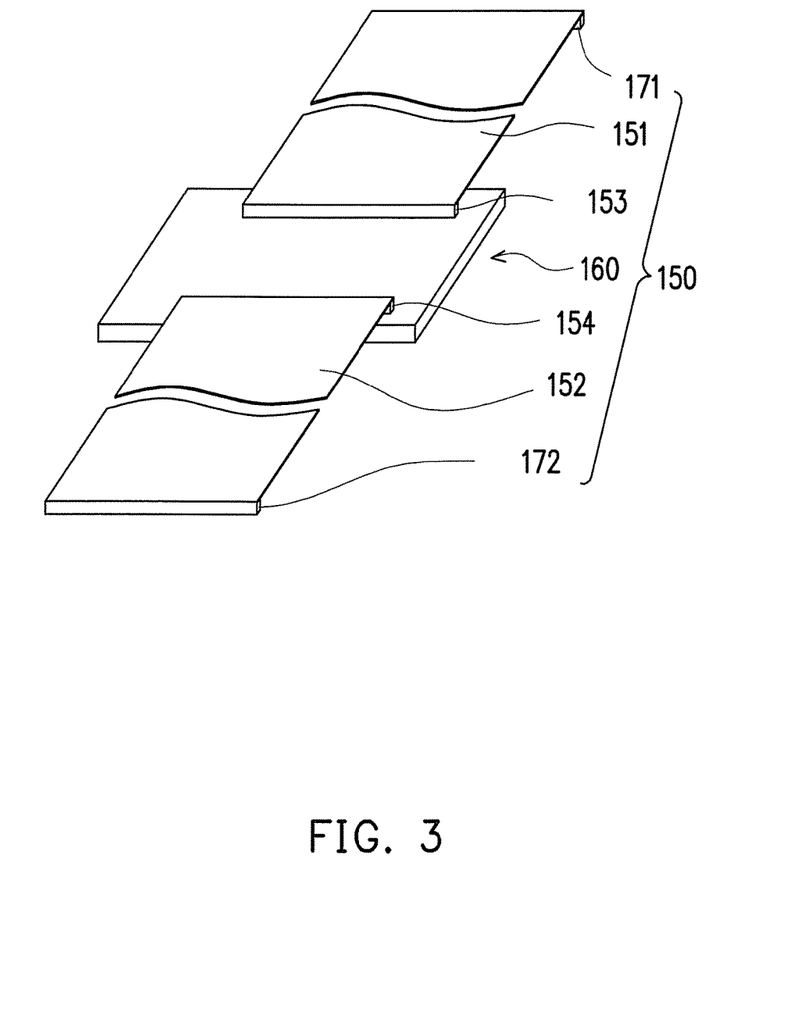
FIG. 3 is a schematic diagram of an electro-static discharge protection structure according to an embodiment of the invention.

FIG. 3 is a schematic diagram of an electro-static discharge protection structure according to an embodiment of the invention. As shown in FIG. 3, an electro-static discharge protection structure 150 includes a first discharge circuit 151 and a discharge device 160. A side of the first discharge circuit 151 is electrically connected to the upper housing 111 of the housing 110 of FIG. 1 and the other side is connected to the discharge device 160. In addition, the electro-static discharge protection structure 150 of this embodiment further includes a second discharge circuit 152.

The second discharge circuit 152 is connected to the other side of the discharge device 160 opposite to the first discharge circuit 151, and the second discharge circuit 152 is electrically connected to the signal transmission connector 122 of FIG. 1. In this embodiment, the first discharge circuit 151 and the second discharge circuit 152 may be flexible printed cables (FPC), flexible flat cables (FFC), or copper sheets.

The electro-static discharge protection structure 150 may further include a first cover 153 and a second cover 154. The first cover 153 is disposed between the first discharge circuit 151 and the discharge device 160, and the second cover 154 is disposed between the second discharge circuit 152 and the discharge device 160, so as to tightly press the first discharge circuit 151 and the second discharge circuit 152 onto the discharge device 160. Moreover, the first cover 153 and the second cover 154 of this embodiment are conductive connectors, for example.

With reference to FIG. 3 again, a first magnetic component 171 is disposed between the first discharge circuit 151 and the upper housing 111 of FIG. 1, and a second magnetic component 172 is disposed between the second discharge circuit 152 and the signal transmission connector 122 of FIG. 1, so as to detachably fix the first discharge circuit 151 and the second discharge circuit 152 to the upper housing 111 and the signal transmission connector 122 respectively. In this embodiment, the first and second magnetic components 171 and 172 have the advantages that they are not compressed to deform and do not fall off after being used for a long time and have smaller impedance in comparison with conductive foam. Therefore, even if the electronic device 100 is used for a long time, the first magnetic component 171 and the second magnetic component 172 may tightly fix the first discharge circuit 151 and the second discharge circuit 152 to the surfaces of the upper housing 111 and the signal transmission connector 122 respectively.

Of course, in addition to using the first magnetic component 171 and the second magnetic component 172 to fix the first discharge circuit 151 and the second discharge circuit 152 to the upper housing 111 and the signal transmission connector 122, in other embodiments of the invention that are not shown here, the first discharge circuit 151 and the second discharge circuit 152 may also be electrically bonded to the upper housing 111 and the signal transmission connector 122 through a bonding method, such as adhesion, locking, and riveting, such that the electronic device 100 may achieve quick discharge through the electro-static discharge protection structure 150.

Figure 4:
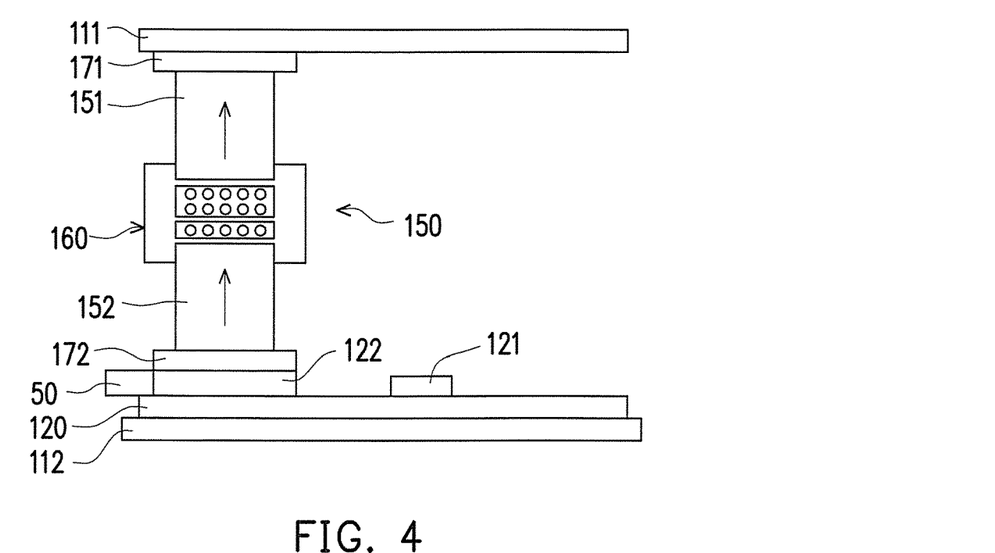
FIG. 4 is a schematic cross-sectional diagram taken along the line AA' of FIG. 1.
Figure 5:
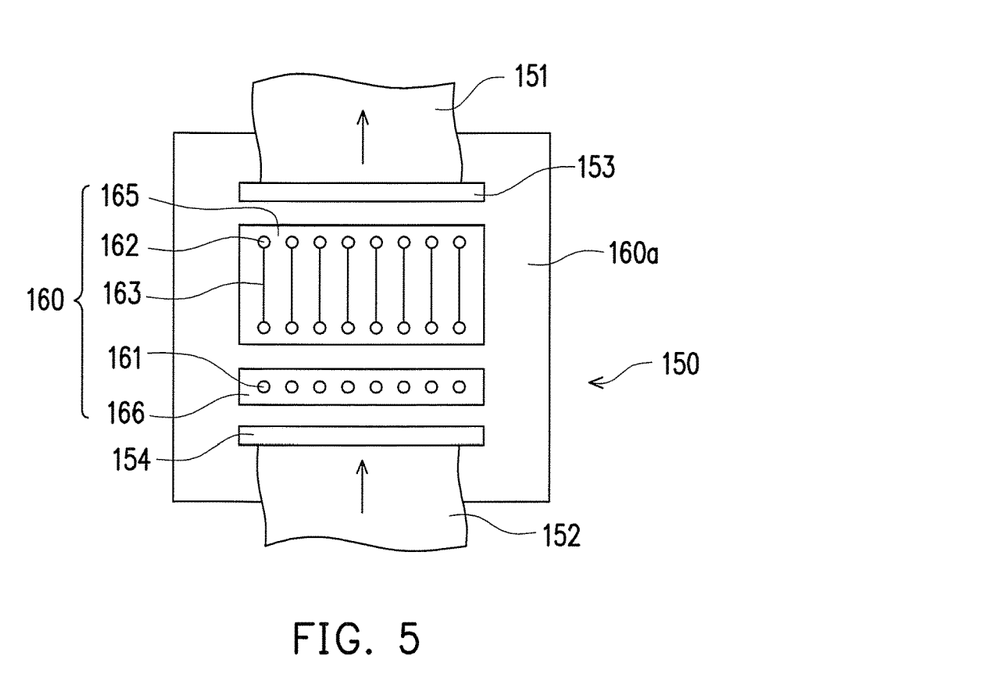
FIG. 5 is a schematic enlarged diagram of the electro-static discharge protection structure of FIG. 4.

FIG. 4 is a schematic cross-sectional diagram taken along the line AA' of FIG. 1. FIG. 5 is a schematic enlarged diagram of the electro-static discharge protection structure of FIG. 4. With reference to FIG. 4 and FIG. 5, the discharge device 160 includes a first discharge plate 160a and the first discharge plate 160a includes a first ground region 165 and a second ground region 166. Moreover, the first discharge plate 160a has a plurality of charge entry points 161, a plurality of charge exit points 162, and a discharge line 163 electrically connected with each charge exit point 162 respectively. In this embodiment, the charge exit points 162 and the discharge lines 163 are disposed in the first ground region 165, and the charge entry points 161 are disposed in the second ground region 166, and the discharge lines 163 are disposed between the charge entry points 161 and the charge exit points 162. In addition, the discharge line 163 of this embodiment is fabricated by using a microstrip line or a wire material that releases static electricity, such as an aluminum or copper conductive wire, for example. Further, as shown in FIG. 4, the signal transmission connector 122 may be disposed between the discharge device 160 and the printed circuit board 120.

For example, when a USB device 50 that carries the static electricity of the user is inserted into the signal transmission connector 122, or the user directly touches the signal transmission connector 122 of the electronic device 100, the static electricity is transmitted sequentially through the signal transmission connector 122, the second magnetic component 172, the second discharge circuit 152, the charge entry points 161 on the second ground region 166, the discharge lines 163 of the first ground region, the charge exit points 162, the first discharge circuit 151, and the first magnetic component 171 in the direction of the arrow in FIG. 4 and FIG. 5 to the upper housing 111 to be released to the outside. The electro-static discharge path described above prevents the static electricity from directly passing the printed circuit board 120 to enter the chip set 121 above, so as to prevent the electronic device 100 from being damaged by the static electricity and ensure a proper operation of the electronic device 100.

In addition, in this embodiment, no direct electrical connection exists between the charge entry points 161 on the second ground region 166 and the discharge lines 163 and the charge exit points 162 on the first ground region 165 and between charge exit points 162 and the first discharge circuit 151. In this embodiment, the static electricity is transmitted from the charge entry points 161 to the discharge lines 163 and the charge exit points 162 on the first ground region 165 through jumping. Then, the static electricity is transmitted from the charge exit points 162 to the first discharge circuit 151 through jumping. Therefore, in this embodiment, the upper housing 111 and the lower housing 112 are not directly electrically connected with each other. Hence, when a power supply supplies power to the electronic device 100, the upper housing 111 does not generate a leakage current flowing to the surface of the housing 110 of the electronic device 100, such that the user does not get an electric shock when touching any part of the housing 111.

Figure 6:
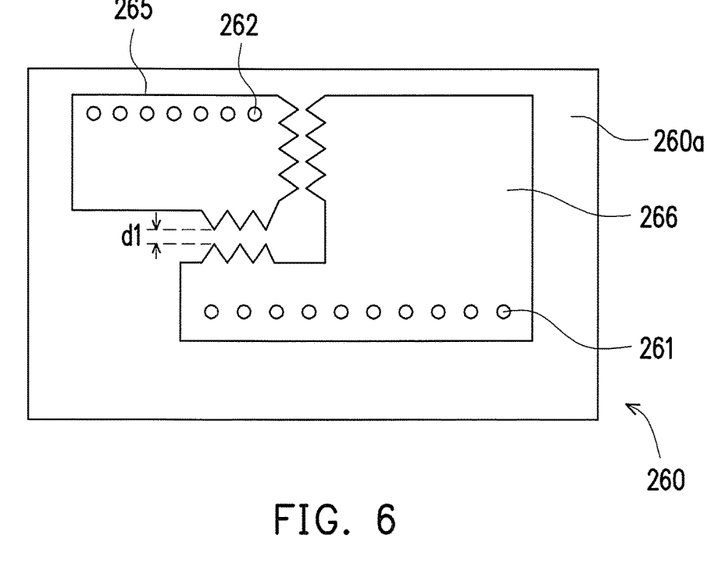
FIG. 6 is a schematic diagram of the discharge device according to another embodiment of the invention.

FIG. 6 is a schematic diagram of the discharge device according to another embodiment of the invention. The discharge device of this embodiment has a structure similar to that of the discharge device of FIG. 5. Therefore, identical or similar components are assigned with identical or similar reference numerals and a description thereof is not repeated hereinafter. In this embodiment, in addition to the aforementioned first discharge plate 160a, the discharge device 260 further includes a second discharge plate 260a stacked on the first discharge plate 160a to expedite release of the static electricity. For example, the second discharge plate 260a has a first ground region 265, a second ground region 266, charge entry points 261 disposed on the second ground region 266, and charge exit points disposed on the first ground region 265. The charge entry points 261 are electrically connected with the charge entry points 161 on the first discharge plate 160a.

In this embodiment, the first ground region 265 and the second ground region 266 are presented in a zigzag pattern, and a sharp point of the first ground region 265 and a sharp point of the second ground region 266 are arranged corresponding to each other with a gap d1 therebetween. Moreover, the static electricity may enter the discharge device 260 through the charge entry points 261 on the second ground region 266. Then, as shown in FIG. 5, the static electricity is transmitted from the second ground region 266 to the first ground region 265 through the sharp points of the zigzag portions of the first and second ground regions 265 and 266 by point discharge. Thereafter, the static electricity is released to the upper housing 111 of the electronic device 100 from the charge exit points 262 on the first ground region 265 by jumping. In this embodiment, the point discharge method described above achieves the effect of quick discharge.

Figure 7:
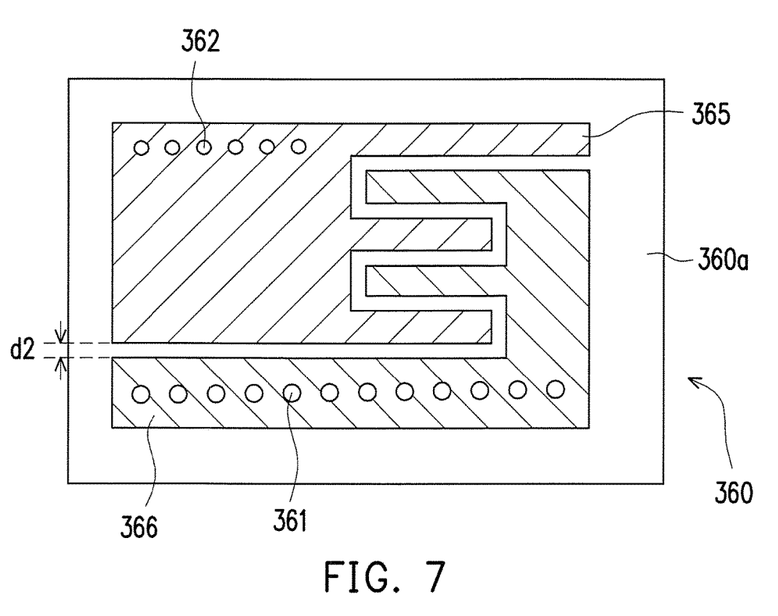
FIG. 7 is a schematic diagram of the discharge device according to another embodiment of the invention.

FIG. 7 is a schematic diagram of the discharge device according to another embodiment of the invention. The discharge device of this embodiment has a structure similar to that of the discharge device of FIG. 6. Therefore, identical or similar components are assigned with identical or similar reference numerals and a description thereof is not repeated hereinafter. In this embodiment, in addition to the first and second discharge plates 160a and 260a, the discharge device 360 further includes a third discharge plate 360a stacked on the first and second discharge plates 160a and 260a to expedite release of the static electricity. The third discharge plate 360a has a first ground region 365, a second ground region 366, a plurality of charge entry points 361 disposed on the second ground region 366, and a plurality of charge exit points 362 disposed on the first ground region 365. The charge entry points 361 are electrically connected with the charge entry points 161 and 261 on the first and second discharge plates 160a and 260a respectively.

In this embodiment, the first ground region 365 and the second ground region 366 are arranged corresponding to each other in a staggered pattern, and a gap d2 between the first ground region 365 and the second ground region 366 is 1 cm or less, so as to transmit the static electricity from the second ground region 366 to the first ground region 365. In this embodiment, the static electricity enters the discharge device 360 from the charge entry points 361 on the second ground region 366. Then, the static electricity is transmitted from the second ground region 366 to the first ground region 365 by jumping. Thereafter, the static electricity is released to the upper housing 111 of the electronic device 100 through the charge exit points 362 on the first ground region 365 by jumping. In this embodiment, the configuration of the third discharge plate 360a increases the adjacent area between the first ground region 365 and the second ground region 366, thereby increasing the discharge area for static electricity transmission between the first ground region 365 and the second ground region 366 and the discharge current.

Figure 8:
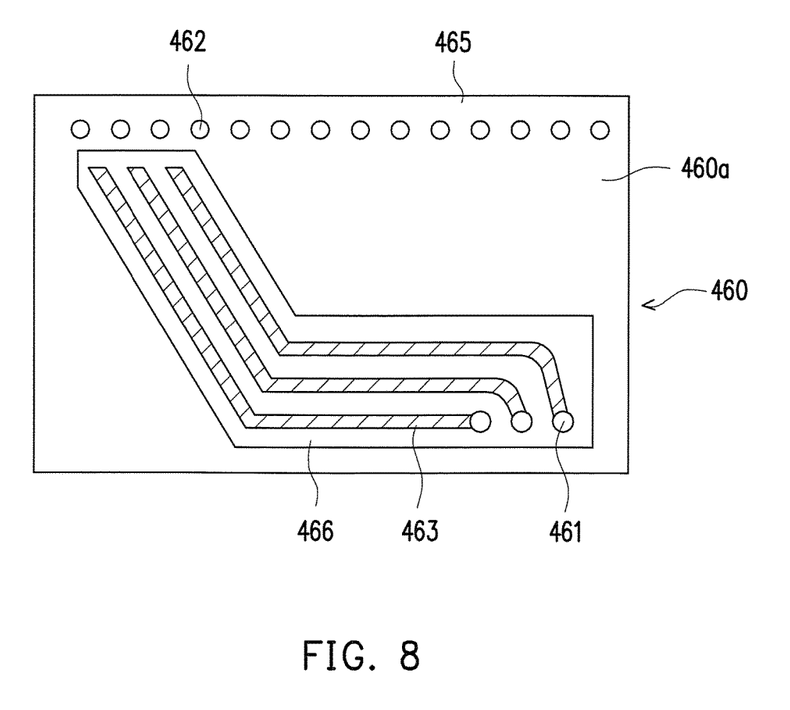
FIG. 8 is a schematic diagram of the discharge device according to another embodiment of the invention.

FIG. 8 is a schematic diagram of the discharge device according to another embodiment of the invention. The discharge device of this embodiment has a structure similar to that of the discharge device of FIG. 7. Therefore, identical or similar components are assigned with identical or similar reference numerals and a description thereof is not repeated hereinafter. In this embodiment, in addition to the first, second, and third discharge plates 160a, 260a, and 360a, the discharge device 360 further includes a fourth discharge plate 460a stacked on the first, second, and third discharge plates 160a, 260a, and 360a to further expedite release of the static electricity. In this embodiment, the fourth discharge plate 460a has a plurality of charge entry points 461 and a plurality of charge exit points 462 respectively disposed on the second ground region 466 and the first ground region 465. The charge entry points 461 may be electrically connected with the charge entry points 161, 261, and 361 on the first, second, and third discharge plates 160a, 260a, and 360a. In this embodiment, the second ground region 466 is a hollow region, and the second ground region 466 has a plurality of discharge lines 463 therein. The discharge lines 463 of this embodiment are fabricated by using a microstrip line or an aluminum or copper conductive wire, for example.

In this embodiment, when the static electricity is introduced to the charge entry points 461 of the second ground region 466, the static electricity is transmitted to the first ground region 465 through the discharge lines 463, thereby adding two independent surfaces to achieve the discharge effect. Moreover, the sequence that the first, second, third, and fourth discharge plates 160*a*, 260*a*, 360*a*, and 460*a* are stacked and the number thereof in the invention are not limited to the embodiments described above and may be adjusted and varied according to the actual requirements.

To conclude, the electro-static discharge protection structure of the invention is adapted for the electronic device, so as to prevent the static electricity carried by a device or the user from directly transmitting to the printed circuit board and causing damage to the signal transmission connector on the printed circuit board and the entire electronic device when the device carrying the static electricity is inserted into the electronic device or when the user directly touches the transmission interface of the electronic device. In addition, the electro-static discharge protection structure of the invention has a plurality of charge entry points and a plurality of charge exit points, such that the static electricity is transmitted from the charge entry points to the charge exit points by jumping, so as to prevent a leakage current on the surface of the housing of the electronic device and protect the user from getting an electric shock when the user touches the housing. Moreover, the discharge device of the invention includes one or multiple layers of discharge plates to increase the discharge path and improve the discharge effect of static electricity.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. An electro-static discharge protection structure for an electronic device that comprises a housing, a printed circuit board, and a connector, the electro-static discharge protection structure comprising:
   a first discharge circuit electrically connected to the housing; and
   a discharge device connected to the first discharge circuit and comprising at least one discharge plate that comprises a plurality of charge entry points and a plurality of charge exit points thereon, wherein the connector is disposed between the discharge device and the printed circuit board.

2. The electro-static discharge protection structure according to claim 1, wherein the at least one discharge plate further comprises a first ground region and a second ground region, wherein the charge exit points are disposed in the first ground region and the charge entry points are disposed in the second ground region.

3. The electro-static discharge protection structure according to claim 2, wherein the at least one discharge plate further comprises a plurality of discharge lines disposed between the charge entry points and the charge exit points.

4. The electro-static discharge protection structure according to claim 3, wherein the second ground region is a hollow region disposed in the first ground region.

5. The electro-static discharge protection structure according to claim 2, wherein the first ground region and the second ground region are presented in a zigzag pattern and a sharp point of the first ground region and a sharp point of the second ground region are arranged corresponding to each other with a gap therebetween, and static electricity is transmitted from the second ground region to the first ground region through the sharp points of the first and second ground regions by point discharge.

6. The electro-static discharge protection structure according to claim 2, wherein the first ground region and the second ground region are arranged corresponding to each other in a staggered pattern, wherein a gap between the first ground region and the second pound region is 1 cm or less.

7. The electro-static discharge protection structure according to claim 1, further comprising a second discharge circuit connected to the discharge device, wherein the connector is disposed between the second discharge circuit and the printed circuit board.

8. The electro-static discharge protection structure according to claim 7, further comprising a first cover and a second cover, wherein the first cover is connected between the first discharge circuit and the discharge device, and the second cover is connected between the second discharge circuit and the discharge device.

9. The electro-static discharge protection structure according to claim 7, further comprising a first magnetic component and a second magnetic component that detachably fix the first discharge circuit and the second discharge circuit onto the housing and the connector respectively.

10. The electro-static discharge protection structure according to claim 1, wherein the connector is a RS232 transmission interface port or a universal serial bus port.

11. An electronic device, comprising:
    a housing;
    a printed circuit board disposed on the housing;
    an electro-static discharge protection structure, comprising:
       a first discharge circuit electrically connected to the housing; and
       a discharge device connected to the first discharge circuit and comprising at least one discharge plate that comprises a plurality of charge entry points and a plurality of charge exit points thereon; and
    a connector disposed between the discharge device and the printed circuit board.

12. The electronic device according to claim 11, wherein the at least one discharge plate further comprises a first ground region and a second ground region, wherein the charge exit points are disposed in the first ground region and the charge entry points are disposed in the second ground region.

13. The electronic device according to claim 12, wherein the at least one discharge plate further comprises a plurality of discharge lines disposed between the charge entry points and the charge exit points.

14. The electronic device according to claim 13, wherein the second ground region is a hollow region disposed in the first ground region.

15. The electronic device according to claim 12, wherein the first ground region and the second ground region are presented in a zigzag pattern and a sharp point of the first ground region and a sharp point of the second ground region are arranged corresponding to each other with a gap therebetween, and static electricity is transmitted from the second ground region to the first ground region through the sharp points of the first and second ground regions by point discharge.

16. The electronic device according to claim 12, wherein the first ground region and the second ground region are arranged corresponding to each other in a staggered pattern, wherein a gap between the first ground region and the second ground region is 1 cm or less.

17. The electronic device according to claim 11, wherein the electro-static discharge protection structure further comprises a second discharge circuit connected to the discharge device, wherein the connector is disposed between the second discharge circuit and the printed circuit board.

18. The electronic device according to claim 17, wherein the electro-static discharge protection structure further comprises a first cover and a second cover, wherein the first cover is connected between the first discharge circuit and the discharge device, and the second cover is connected between the second discharge circuit and the discharge device.

19. The electronic device according to claim 17, wherein the electro-static discharge protection structure further comprises a first magnetic component and a second magnetic component that detachably fix the first discharge circuit and the second discharge circuit onto the housing and the connector respectively.

20. The electronic device according to claim 11, wherein the connector is a RS232 transmission interface port or a universal serial bus port.

\* \* \* \* \*